(12) United States Patent
Thimmannagari (10) Patent No.: US 7,203,821 B2
(45) Date of Patent: Apr. 10, 2007

(54) METHOD AND APPARATUS TO HANDLE WINDOW MANAGEMENT INSTRUCTIONS WITHOUT POST SERIALIZATION IN AN OUT OF ORDER MULTI-ISSUE PROCESSOR SUPPORTING MULTIPLE STRANDS

(75) Inventor: Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 519 days.

(21) Appl. No.: 10/338,438

(22) Filed: Jan. 8, 2003

(65) Prior Publication Data

US 2004/0133768 A1 Jul. 8, 2004

(51) Int. Cl.
*G06F 9/44* (2006.01)
(52) U.S. Cl. ..................................................... 712/228
(58) Field of Classification Search ..................... None
See application file for complete search history.

(56) References Cited

U.S. PATENT DOCUMENTS

| | | | | |
|---|---|---|---|---|
| 5,922,065 A | * | 7/1999 | Hull et al. ..................... 712/24 |
| 5,941,977 A | | 8/1999 | Panwar et al. ................. 712/23 |
| 5,966,530 A | * | 10/1999 | Shen et al. .................. 712/244 |
| 6,098,165 A | * | 8/2000 | Panwar et al. ............... 712/215 |

OTHER PUBLICATIONS

D.L. Weaver and T. Germond. "The Sparc Architecture Manual." Version 9, Prentice Hall, Englewood Cliffs, New Jersey, 1994.*
Marc Tremblay, Bill Joy and Ken Shin "A Three Dimensional Register File for Superscalar Processors" Proceedings of the 28th Annual Hawaii International Conference on System Sciences—1995—IEEE pp. 191-201.
PCT International Search Report for PCT/US2004/000303 (3 pages); and Notification of the International Search Report et al. (dated Jun. 22, 2004) (1 page).

* cited by examiner

*Primary Examiner*—Eddie Chan
*Assistant Examiner*—Jacob Petranek
(74) *Attorney, Agent, or Firm*—Osha-Liang LLP (57) ABSTRACT

A method and apparatus for handling window management instructions without post serialization in an out-of-order multi-issue processor includes an instruction decode unit arranged to decode the window management instruction. A plurality of register windows are indexed by a current window pointer, and a working copy of the current window pointer is stored in a register in the instruction decode unit. The instruction decode unit uses the working copy of the current window pointer to handle the window management instruction.

20 Claims, 5 Drawing Sheets

REGISTER FLATTENING TABLE

| UNFLATTENED | CWP=4 or CWP=0 | CWP=0 | CWP=0 or CWP=1 | CWP=1 | CWP=1 or CWP=2 | CWP=2 | CWP=2 or CWP=3 | CWP=3 | CWP=3 or CWP=4 | CWP=4 |
|---|---|---|---|---|---|---|---|---|---|---|
| | | | | FLATTENED | | | | | | |
| r23 | | 47 | | 63 | | 79 | | 95 | | 111 |
| r22 | | 46 | | 62 | | 78 | | 94 | | 110 |
| r21 | | 45 | | 61 | | 77 | | 93 | | 109 |
| r20 | | 44 | | 60 | | 76 | | 92 | | 108 |
| r19 | | 43 | | 59 | | 75 | | 91 | | 107 |
| r18 | | 42 | | 58 | | 74 | | 90 | | 106 |
| r17 | | 41 | | 57 | | 73 | | 89 | | 105 |
| r16 | | 40 | | 56 | | 72 | | 88 | | 104 |
| r15 / r31 | 39 | | 55 | | 71 | | 87 | | 103 | |
| r14 / r30 | 38 | | 54 | | 70 | | 86 | | 102 | |
| r13 / r29 | 37 | | 53 | | 69 | | 85 | | 101 | |
| r12 / r28 | 36 | | 52 | | 68 | | 84 | | 100 | |
| r11 / r27 | 35 | | 51 | | 67 | | 83 | | 99 | |
| r10 / r26 | 34 | | 50 | | 66 | | 82 | | 98 | |
| r9 / r25 | 33 | | 49 | | 65 | | 81 | | 97 | |
| r8 / r24 | 32 | | 48 | | 64 | | 80 | | 96 | |

METHOD AND APPARATUS TO HANDLE WINDOW MANAGEMENT INSTRUCTIONS WITHOUT POST SERIALIZATION IN AN OUT OF ORDER MULTI-ISSUE PROCESSOR SUPPORTING MULTIPLE STRANDS

BACKGROUND OF INVENTION

1. Field of the Invention

The present invention is directed to a method and apparatus for handling window management instructions without post serialization in an out-of-order multi-issue processor.

2. Description of Related Art

Figure 1:
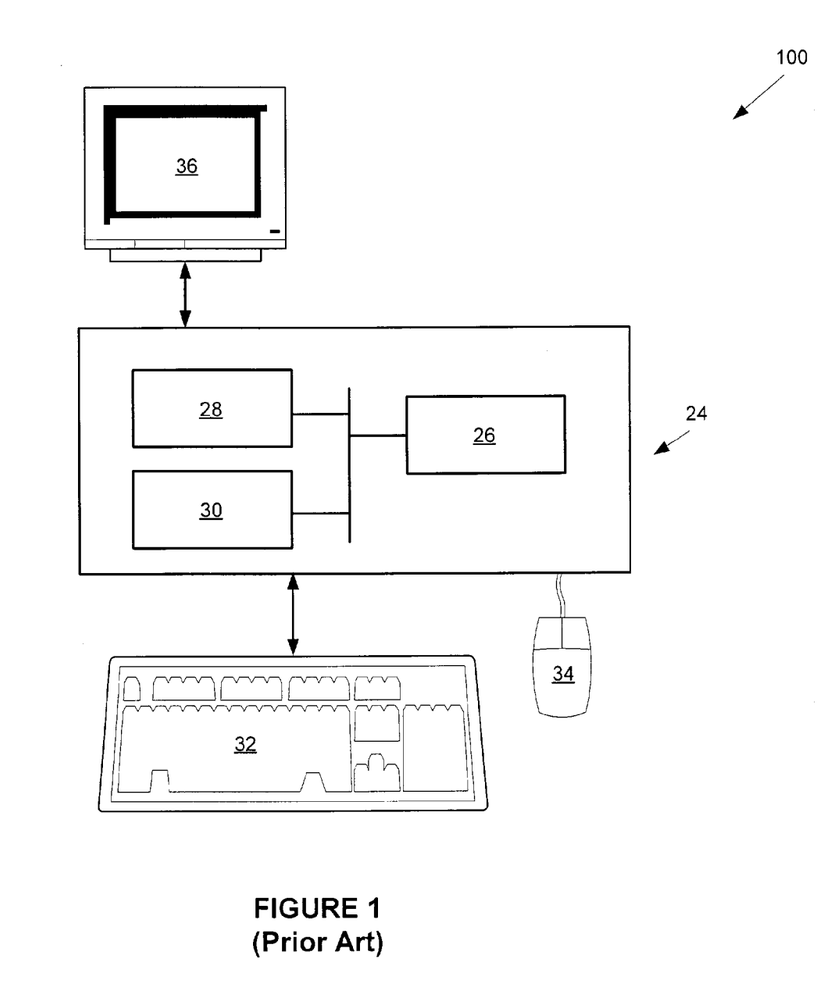
FIG. 1 shows a block diagram of a prior art computer system.

As shown in FIG. 1, a computer (24) includes a processor (26), memory (28), a storage device (30), and numerous other elements and functionalities found in computers. The computer (24) may also include input means, such as a keyboard (32) and a mouse (34), and output means, such as a monitor (36). Those skilled in the art will appreciate that these input and output means may take other forms.

The processor (26) processes instructions determined by a program. Programs often have subroutines. A subroutine may be given a new register window in the processor (26) to receive values (e.g., local variables) from a program and possibly replace those values based on the instructions in the subroutine. A register window is a register (e.g., storage location) that initially receives values from a program in a parent register window. Values from the parent register window may be provided to a child register window. The child register window may provide values back to the parent register window and/or a grandchild register window. Depending on a processor's architecture, a register window structure may be many levels deep.

Window management instructions (e.g., SAVE, RESTORE, and RETURN) are used to create and release register windows, and write value(s) into a new register window. For example, SAVE creates a new register window and writes a value into the new register window. RESTORE releases a register window while updating a register in a previous, old register window. RETURN releases a register window without updating a value.

Instructions that follow a window management instruction should see a valid current window pointer. Accordingly, window management instructions are post serialized. In other words, a window management instruction must be committed before any instruction that follows the window management instruction is allowed to issue.

Window management instructions account for a significant amount of instructions in a program. Each time a window management instruction issues, performance is affected as instructions that follow a window management instruction are stalled until the window management instruction completes.

SUMMARY OF INVENTION

According to one aspect of the present invention, an apparatus comprising a plurality of register windows indexed by a current window pointer; an instruction decode unit arranged to decode a window management instruction; and a register arranged to store a working copy of the current window pointer in the instruction decode unit.

According to one aspect of the present invention, a method for handling a window management instruction comprising decoding the window management instruction; storing information in at least one of a plurality of register windows dependent on the decoding; and updating a working copy of a current window pointer that indexes the at least one of the plurality of register windows.

According to one aspect of the present invention, an apparatus comprising means for decoding a window management instruction; means for storing information dependent on the means for decoding; and means for updating a working copy of a current window pointer.

Other aspects and advantages of the invention will be apparent from the following description and the appended claims.

DETAILED DESCRIPTION

Embodiments of the present invention relate to a method and apparatus to handle window management instructions. A register that maintains a working copy of a current window pointer exists in an instruction decode unit such that instructions following a window management instruction are not stalled until the window management instruction gets commited.

Figure 2:
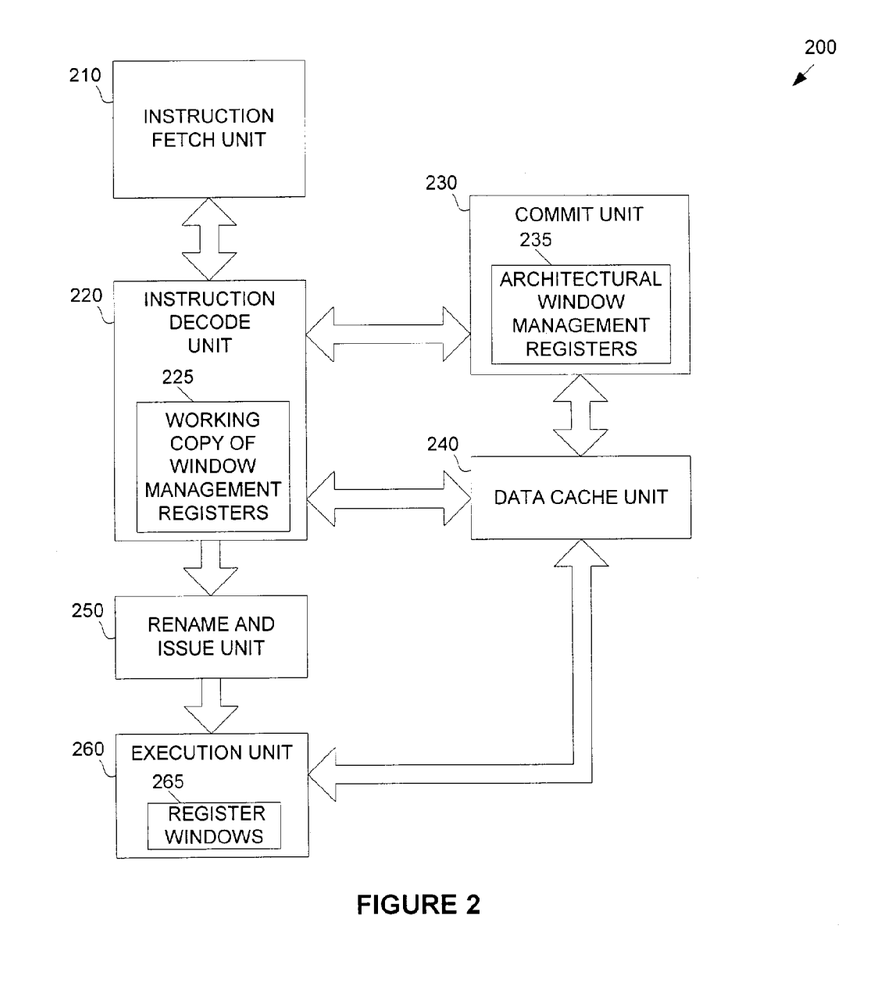
FIG. 2 shows a block diagram of a computer system pipeline in accordance with an embodiment of the present invention.

FIG. 2 shows a block diagram of an exemplary computer system pipeline (200) in accordance with an embodiment of the present invention. The computer system pipeline (200) includes an instruction fetch unit (210), an instruction decode unit (220), a commit unit (230), a data cache unit (240), a rename and issue unit (250), and an execution unit (260). Those skilled in the art will note that not all functional units of a computer system pipeline are shown in the computer system pipeline (200), e.g., a memory management unit. Any of the units (210, 220, 230, 240, 250, 260) may be pipelined or include more than one stage. Accordingly, any of the units (210, 220, 230, 240, 250, 260) may take longer than one cycle to complete a process.

The instruction fetch unit (210) is responsible for fetching instructions from memory. Accordingly, instructions may not be readily available, i.e., a memory miss occurs. The instruction fetch unit (210) performs actions to fetch the proper instructions.

In one embodiment, the instruction fetch unit (210) allows two instruction strands to be running in the instruction fetch unit (210) at any time. Only one strand, however, may actually be fetching instructions at any time. At least two buffers are maintained to support the two strands. The instruction fetch unit (210) fetches bundles of instructions. For example, in one or more embodiments, up to three instructions may be included in each bundle, or fetch group.

In one embodiment, the instruction decode unit (220) is divided into two decode stages (D1, D2). D1 and D2 are each responsible for partial decoding of an instruction. D1 may also flatten register fields, manage resources, kill delay slots, determine strand switching, and determine the existence of a front end stall. Flattening a register field maps a smaller number of register bits to a larger number of register bits that maintain the identity of the smaller number of register bits and additional information such as a particular architectural register file. A front end stall may occur if an instruction is complex, requires serialization, is a window management instruction, results in a hardware spill/fill, has an evil twin condition, or a control transfer instruction, i.e., has a branch in a delay slot of another branch.

A complex instruction is an instruction not directly supported by hardware and may require the complex instruction to be broken into a plurality of instructions supported by hardware. An evil twin condition may occur when executing a fetch group that contains both single and double precision floating point instructions. A register may function as both a source register of the single precision floating point instruction and as a destination register of a double precision floating point instruction, or vice versa. The dual use of the register may result in an improper execution of a subsequent floating point instruction if a preceding floating point instruction has not fully executed, i.e., committed the results of the computation to an architectural register file.

The instruction decode unit (220) maintains a working copy of a current window pointer, CANSAVE, CANRESTORE, OTHERWIN, and CLEANWIN in registers (225). The working copy of the current window pointer may be incremented or decremented by the instruction decode unit (220) such that instructions that follow a window management instruction see a correct current window pointer. The function of CANSAVE, CANRESTORE, OTHERWIN, and CLEANWIN is described below with reference to FIG. 5.

The instruction decode unit (220) also maintains in registers (225) a working copy of a current window pointer for each strand. When a strand switch occurs from a first strand to a second strand, the working copy of the current window pointer is written to a register for the first strand. Contents of a register for the second strand is substituted for the working copy of a current window pointer. The working copy of a current window pointer is incremented/decremented as needed for the second strand. When a strand switch occurs from the second strand to the first strand, the working copy of the current window pointer is written to the register for the second strand. Contents of the register for the first strand (which was previously stored) is substituted for the working copy of a current window pointer. Accordingly, the working copy of a current window pointer is maintained for multiple strands. Similarly, working copies of CANSAVE, CANRESTORE, OTHERWIN, and CLEANWIN are maintained for multiple strands.

Multiple register windows are maintained for each strand. Furthermore, window registers for a particular strand may be divided between multiple processes. The multiple processes may result from instructions generated by either a user or an operating system kernel.

The instruction decode unit (220) also breaks a bundle of instructions dependent on a position of a window management instruction within the bundle. At most, the instruction decode unit (220) inserts one extra cycle per window management instruction. The instruction decode unit (220) may also need to synchronize the working copy of the window management registers with an architectural window management registers maintained by the commit unit (230). Architectural window management registers (235) (i.e., current window pointer, CANSAVE, CANRESTORE, OTHERWIN, and CLEANWIN) may reside in the commit unit (230) and register windows (265) may reside in the execution unit (260).

The commit unit (230) is responsible for maintaining an architectural state of both strands and initiating traps as needed. The commit unit (230) keeps track of which strand is "alive." A strand is alive if a computer system pipeline has instructions for the strand, and the strand is not in a parked or wait state. A parked state or a wait state is a temporary stall of a strand. A parked state is initiated by an operating system, whereas a wait state is initiated by program code. When a change in the number of strands that are alive occurs, the commit unit (230) restarts the strands in the new state.

The data cache unit (240) is responsible for providing memory access to load and store instructions. Accordingly, the data cache unit (240) includes a data cache, and surrounding arrays, queues, and pipes needed to provide memory access.

The rename and issue unit (250) is responsible for renaming, picking, and issuing instructions. Renaming involves taking flattened instruction source registers provided by the instruction decode unit (220) and renaming the flattened instruction source registers to working registers. Renaming may start in the instruction decode unit (220). Also, the renaming determines whether the flattened instruction source registers should be read from an architectural or working register file.

Picking involves monitoring an operand ready status of an instruction in an issue queue, performing arbitration among instructions that are ready, and selecting which instructions are issued to execution units. The rename and issue unit (250) may issue one or more instructions dependent on a number of execution units and an availability of an execution unit. The computer system pipeline (200) may be arranged to simultaneously process multiple instructions. Issuing instructions steers instructions selected by the picking to an appropriate execution unit. The rename and issue unit (250) may issue instructions out of order.

The execution unit (260) is responsible for executing the instructions issued by the rename and issue unit (250). The execution unit (260) may include multiple functional units such that multiple instructions may be executed simultaneously (i.e., a multi-issue processor).

The execution unit (260) may include a plurality of register windows for each strand. In one embodiment, five register windows are supported for each strand. The five register windows may be used by multiple processes. A register window may pass a value to another register window dependent on a window management instruction. A current window pointer may point to an active register window. Additional information may be maintained such that the number of additional register windows that are available may be known. Furthermore, a set of register windows may be split, with each group of register windows supporting a different process (user or kernel).

In FIG. 2, each of the units (210, 220, 230, 240, 250, 260) provides processes to load, break down, and execute instructions. Resources are required to perform the processes. In an embodiment of the present invention, "resources" are any queue that may be required to process an instruction. For example, the queues include a live instruction table, issue queue, integer working register file, floating point working register file, condition code working register file, load queue, store queue, branch queue, etc. As some resources may not be available at all times, some instructions may be stalled. Furthermore, because some instructions may take more cycles to complete than other instructions, or resources may not currently be available to process one or more of the instructions, other instructions may be stalled. A lack of resources may cause a resource stall. Instruction dependency may also cause some stalls. Accordingly, switching strands may allow some instructions to be processed by the units (210, 220, 230, 240, 250, 260) that may not otherwise have been processed at that time.

Figure 3:
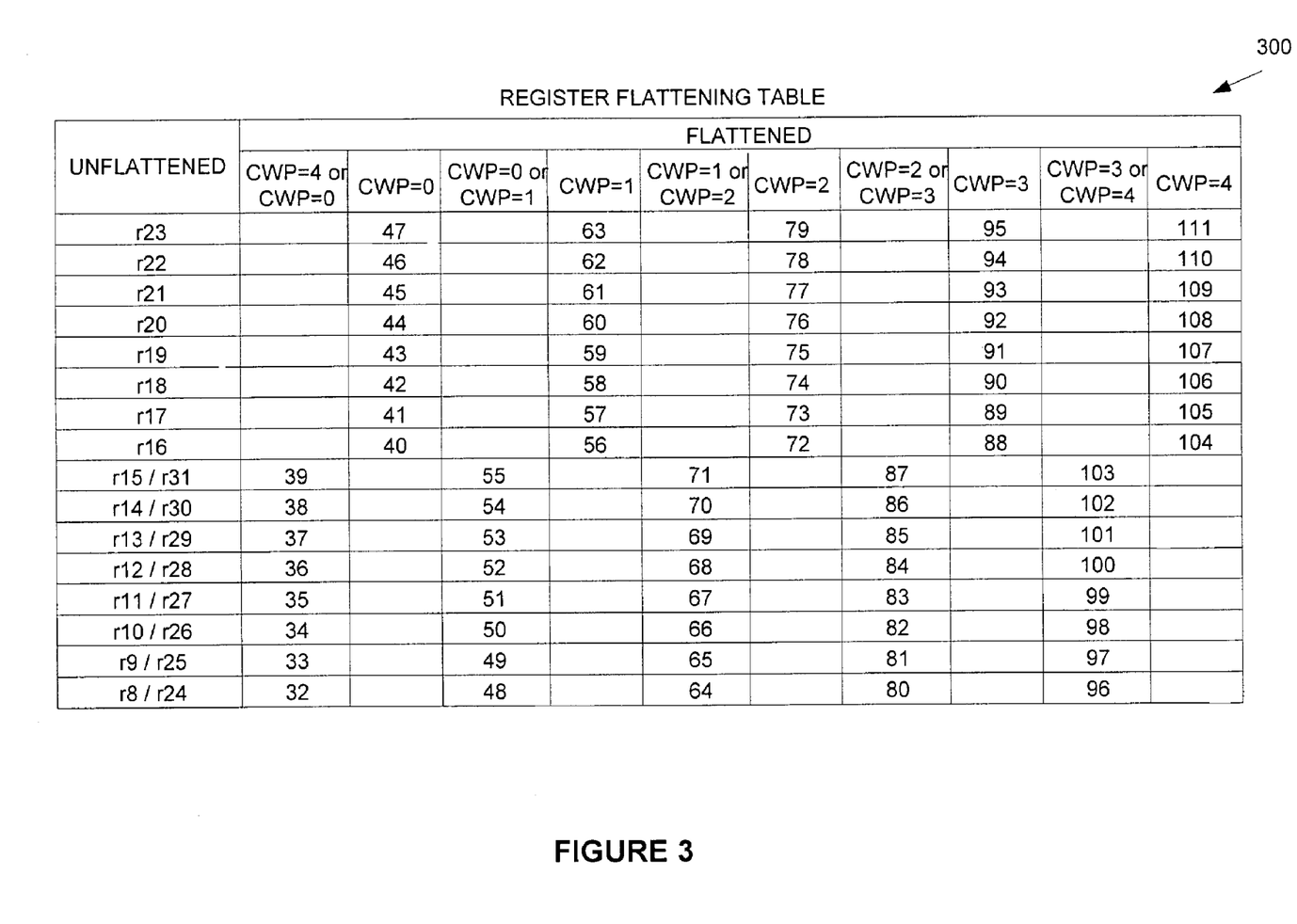
FIG. 3 shows a register flattening table in accordance with an embodiment of the present invention.

FIG. 3 shows an exemplary register flattening table (300) in accordance with an embodiment of the present invention. An instruction decode unit, for example, the instruction decode unit (220) shown in FIG. 2, is responsible for flattening the registers. In one embodiment of the present invention, a 5-bit architectural window address is flattened to a 7-bit address. The additional bits are determined depending on a value of a current window pointer. More specifically, the instruction decode unit uses a working copy of a current window pointer to flatten a register. Depending on which register is flattened, the current window pointer may index either adjacent register window because an input of a register window is the output of an adjacent register window and vice versa.

Figure 4:
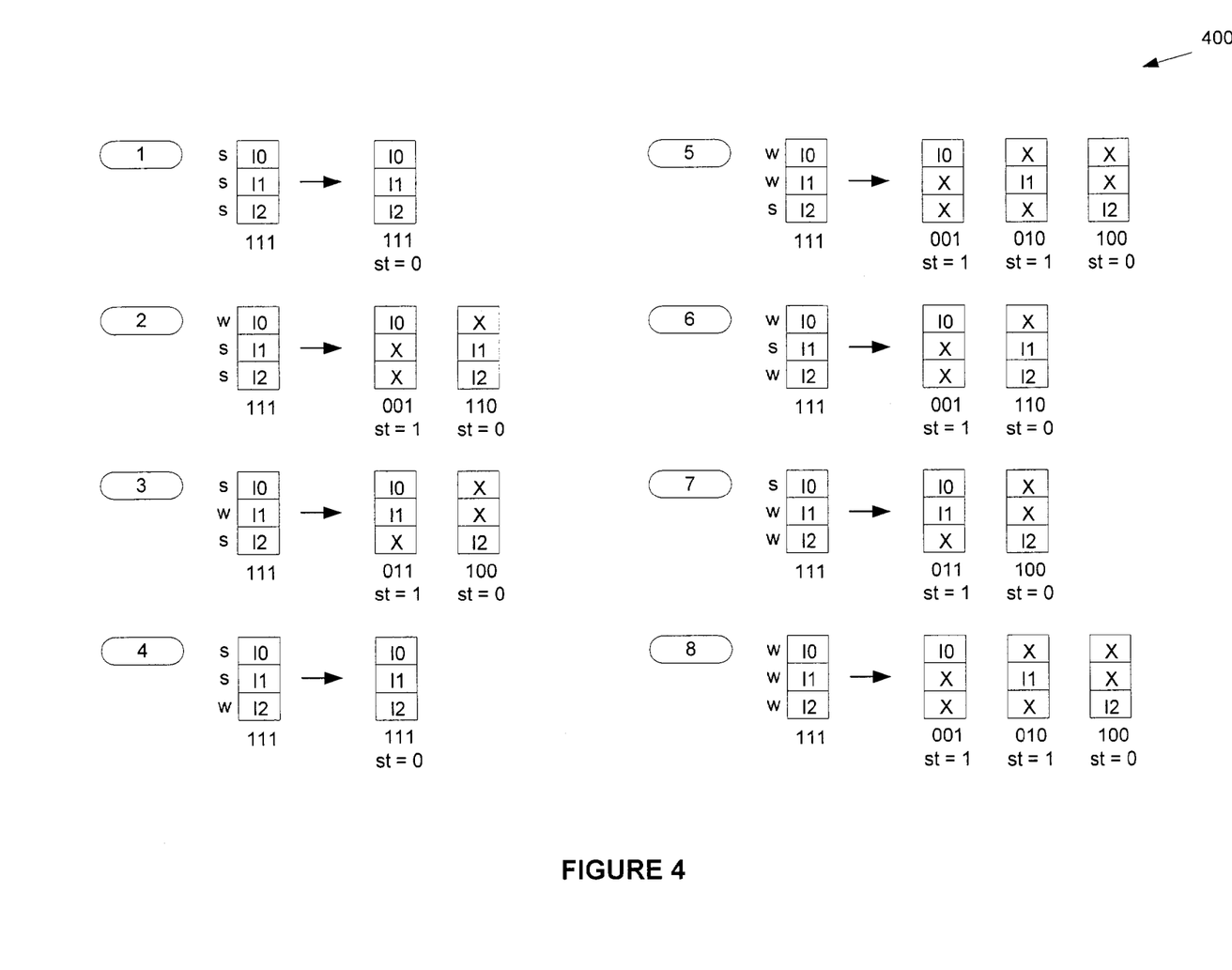
FIG. 4 shows an instruction bundle breaking diagram in accordance with an embodiment of the present invention.

FIG. 4 shows an exemplary instruction bundle breaking diagram (400) in accordance with an embodiment of the present invention. When an instruction fetch unit; e.g., the instruction fetch unit (210) shown in FIG. 2, forwards a bundle which has one or more window management instructions (e.g., SAVE, RESTORE, and RETURN), the instruction decode unit breaks the bundle depending on the position of the window management instructions in the bundle.

FIG. 4 shows the way an instruction decode unit, e.g., the instruction decode unit (220) shown in FIG. 2, breaks a bundle of instructions once a window management instruction is located in a fetch group. The instruction decode unit breaks the bundle such that the last instruction forwarded by the instruction decode unit is a window management instruction when one or more window management instructions are contained in a fetch group. Accordingly, the instruction decode unit updates a working copy of at least the current window pointer, CANSAVE, CANRESTORE, OTHERWIN, and CLEANWIN in a cycle the instruction decode unit is forwarding the window management instruction. Instructions that follow a window management instruction are forwarded in the next cycle such that these "younger" instructions see the updated values of a working copy of at least the current window pointer, CANSAVE, CANRESTORE, OTHERWIN, and CLEANWIN.

In FIG. 4, "s" indicates a simple instruction. A simple instruction does not include a complex, serialized, special branch, or window management instruction. A "w" indicates a window management instruction. A "st" indicates whether a stall occurs for a particular break in a bundle of instructions. If st=1, younger instruction(s) may be forwarded along with a window management instruction. Older instructions (i.e., instructions following the window management instruction) are stalled for at least one cycle. If st=0, no stall occurs for that cycle. An occurrence of a bubble in a pipeline is indicated by "X."

FIG. 4 shows eight possible bundle breaking examples. The eight examples are all possible combinations assuming three instructions in a bundle and that a window management instruction(s) may occur at any position within a bundle. One of ordinary skill in the art will appreciate that a computer architecture may be designed that allows a smaller or large number of instructions in a bundle, and/or has restrictions on a location of a window management instruction within a bundle.

In FIG. 4, an instruction decode unit may synchronize values of a working copy of at least the current window pointer, CANSAVE, CANRESTORE, OTHERWIN, and CLEANWIN with the architectural copies of the current window pointer, CANSAVE, CANRESTORE, OTHER-WIN, and CLEANWIN maintained in architectural window management registers in commit unit for the following cases. First, the instruction decode unit synchronizes the working copies of the registers whenever a commit unit, e.g., a commit unit (230) shown in FIG. 2, sends a clear pipe signal. The clear pipe signal is sent whenever a branch is mispredicted, an instruction results in an exception, an external interrupt occurs, or a strand is parked. Second, the instruction decode unit synchronizes the working copies of the registers whenever a commit unit, e.g., a commit unit (230) shown in FIG. 2, commits a write privileged register (WRPR) instruction. A WRPR instruction may include a write to the current window pointer, CANSAVE, CANRESTORE, OTHERWIN, or CLEANWIN. Accordingly, the instruction decode unit stalls on all instructions following a WRPR instruction and waits for the commit unit to commit the WRPR instruction. Once the commit unit has committed the WRPR instruction, the commit unit will indicate to the instruction decode unit that the WRPR instruction has committed. The instruction decode unit will synchronize the working copies of at least the current window pointer, CANSAVE, CANRESTORE, OTHERWIN, and CLEANWIN and continue to forward instructions following the WRPR instruction.

Figure 5:
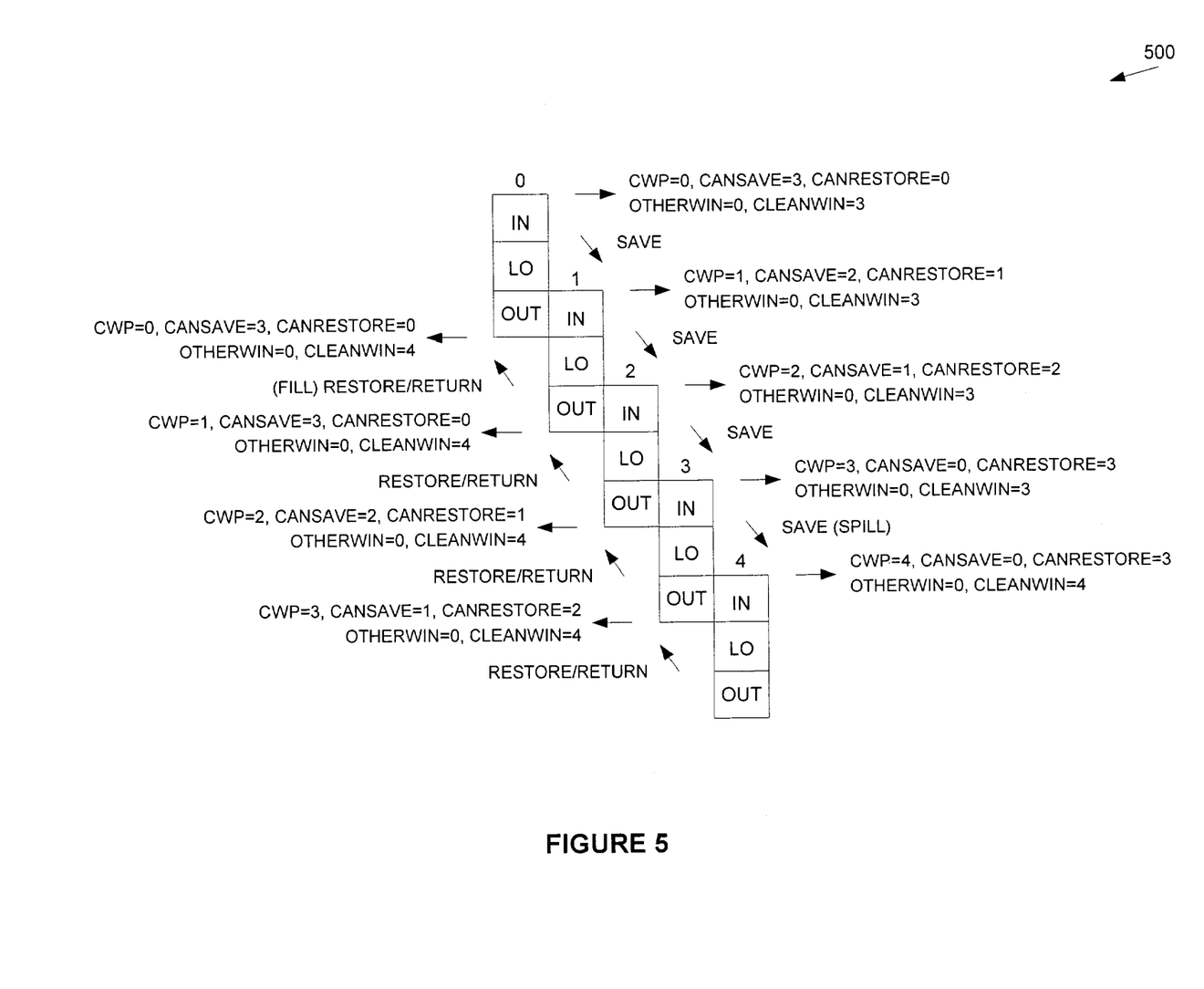
FIG. 5 shows a register window diagram in accordance with an embodiment of the present invention.

FIG. 5 shows an exemplary register window diagram (500) in accordance with an embodiment of the present invention. In one embodiment, five register windows are supported for each strand. FIG. 5 shows various values for the current window pointer, CANSAVE, CANRESTORE, OTHERWIN, and CLEANWIN in each occurrence of a SAVE, RESTORE, or RETURN instruction. The register windows reside in an execution unit, e.g., the execution unit (260) shown in FIG. 2. Working copies of at least the current window pointer, CANSAVE, CANRESTORE, OTHERWIN, and CLEANWIN are maintained in an instruction decode unit, e.g., the instruction decode unit (220) using the registers (225) shown in FIG. 2.

A SAVE operation results in incrementing the current window pointer by one, decrementing CANSAVE by one, and incrementing CANRESTORE by one. The SAVE operation also results in adding the contents of source registers from the current window and writing the result into a destination register in the new register window. If no register windows are available, a spill occurs.

A RESTORE or RETURN operation results in decrementing the current window pointer by one, decrementing CANRESTORE by one, and incrementing CANSAVE by one. If CANRESTORE equals zero, the RESTORE or RETURN operation results in a fill. The RESTORE operation results in adding the contents of source registers from the current window and writing the result into a destination register in an old register window. The RETURN operation results in adding the contents of source registers to form a target address; therefore, values in an old register window are not modified.

In FIG. 5, each register window, numbered 0 through 4, has an "in," "local," and "out" register indicated. The "out" register of a register window is the same as the "in" register of the next register window. The "local" register maintains information used by a program. For example, if register window 0 is currently being used by a program, the "in," "local," and "out" registers are already modified. A subroutine in the program may request a new register window. Accordingly, information to be moved from the "out" register of register window 0, which is equal to an "in" register of register window 1, to be moved to the "local" register of register window 1. When the subroutine is finished with the "local" register of the register window 1, the "local" information may be returned to register window 0. Conversely, the subroutine may have a subroutine and may cause information to be moved from the "out" register of register window 1, which is each to an "in" register of register window 2, to be moved to the "local" register of register window 2.

In FIG. 5, a current window pointer indicates which register window is currently active. CANSAVE indicates how many additional register windows are available to be used without having a spill. The register windows shown in FIG. 5 are circular; therefore, an "out" register of register window 4 is equal to an "in" register of register window 0. Accordingly, CANSAVE equals zero when register window 3 is entered. Use of the "out" register of register window 4 would corrupt register window 0. If an additional register window is requested to be used while in register window 3, a spill occurs; however, the "out" register contents may be maintained in register window 4. CANRESTORE indicates how many additional register windows are available to be restored without causing a fill. If an additional register window is requested to be restored while in register window 1, a fill occurs.

In FIG. 5, OTHERWIN indicates whether a set of register windows has been split between two or more processes. For the purposes of the present invention, processes includes multiples processes from one or more programs (e.g., kernel and/or user programs). OTHERWIN is equal to zero when all the register windows are used by the same process. OTHERWIN is not equal to zero when the set of register windows is used by more than one process.

For example, one process has three register windows and another process has two register windows. While an active process is using the three register windows, OTHERWIN equals two to indicate that the other process has two register windows. Accordingly, CANSAVE and CANRESTORE will indicate a number of register windows that can be saved or restored/returned, respectively, based on the number of register windows available to the process. For example, one process has a set of three register windows which are register windows 0, 1, and 2. The current window pointer is equal to zero. Accordingly, CANSAVE equals one because only one additional window in the set of three register windows is available. Additionally, if the current window pointer equals one, CANSAVE equals zero. Also, a spill will occur if a SAVE instruction is issued while the current window pointer equals one.

In FIG. 5, CLEANWIN indicates a count of the number of register windows other than the current register window that have zeros, valid addresses, or valid data from a particular process. In one embodiment of the present invention, when a processor is powered, CLEANWIN equals four because all register windows have zeros and one of the five register windows is the current window.

A set of register windows may be split, with each group of register windows supporting a different process. For example, an operating system assigns to register window 4 a first process. In the situation where the first process has finished execution, and the operating system wants to allocate all five register windows to a second process, the operating system has to initialize CLEANWIN equal to three so that the second process cleans register window 4 before using it. CLEANWIN is used to prevent the second process from using data belonging, or left over from, the first process.

The values for the current window pointer, CANSAVE, CANRESTORE, OTHERWIN, and CLEANWIN may be changed dependent on an occurrence of a SAVE, RESTORE, or RETURN instruction. Furthermore, working copies of at least the current window pointer, CANSAVE, CANRESTORE, OTHERWIN, and CLEANWIN in an instruction decode unit, e.g., the instruction decode unit (220) shown in FIG. 2, are maintained such that instructions see a valid current window pointer. Accordingly, a working copy of a current window pointer for strand 0 and strand 1, and a working copy of a current window pointer for an active strand is maintained in the instruction decode unit.

The working copy of a current window pointer for an active strand may use information from either the working copy of a current window pointer for strand 0 or strand 1 depending on which strand is active. The working copy of the current window pointer for strand 0 and strand 1, and the working copy of a current window pointer for an active strand maybe incremented or decremented by one to handle the SAVE, RETURN, and RESTORE instructions.

Furthermore, the working copy of the current window pointer for strand 0 and strand 1, and the working copy of a current window pointer for an active strand may be incremented or decremented by two to handle a spill condition because a register window spill is supported in hardware. In one embodiment of the present invention, five register windows are supported, i.e., register window 0 through register window 4. While in register window 2, a SAVE may result in a spill of register window 4. Helper instructions may be used to handle the spill; however, the helper instructions must have a correct working copy of the current window pointer. Accordingly, the working copy of the current window pointer is incremented by two. After forwarding the helper instructions from an instruction decode unit, e.g., the instruction decode unit (220) shown in FIG. 2, the working copy of the current window pointer is required to be decremented by two.

In the above detailed description of the present invention, numerous specific details are set forth in order to provide a more thorough understanding of the present invention. However, one of ordinary skill in the art will understand that the present invention may be practiced without these specific details. Different numbers of register windows and register that indicator a state of the register windows may be used.

Advantages of the present invention may include one or more of the following. In one or more embodiments, a working copy of architectural window management registers in commit unit are maintained in an instruction decode unit. Accordingly, post serialization on a window management instruction is not required. Working copies of the registers may reduce the number of bubbles that occur in a processor pipeline.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
    a plurality of register windows indexed by a current window pointer;
    an instruction decode unit arranged to decode a window management instruction; and
    a register arranged to store a working copy of the current window pointer in the instruction decode unit,
    wherein the instruction decode unit is arranged to break a bundle of instructions dependent on a position of the window management instruction within the bundle such that a last instruction forwarded by the instruction decode unit is a window management instruction, and wherein the working copy of the current window pointer is updated in the same cycle the window management instruction is forwarded by the instruction decode unit.

2. The apparatus of claim 1, wherein the window management instruction comprises a SAVE instruction.

3. The apparatus of claim 1, wherein the window management instruction comprises a RESTORE instruction.

4. The apparatus of claim 1, wherein the window management instruction comprises a RETURN instruction.

5. The apparatus of claim 1, wherein the instruction decode unit is arranged to flatten registers dependent on the working copy of the current window pointer.

6. The apparatus of claim 1, wherein the plurality of register windows support multiple processes.

7. The apparatus of claim 1, further comprising a register in the instruction decode unit arranged to store a working copy of a CANSAVE value.

8. The apparatus of claim 1, further comprising a register in the instruction decode unit arranged to store a working copy of a CANRESTORE value.

9. The apparatus of claim 1, further comprising a register in the instruction decode unit arranged to store a working copy of a OTHERWIN value.

10. The apparatus of claim 1, further comprising a register in the instruction decode unit arranged to store a working copy of a CLEANWIN value.

11. The apparatus of claim 1, further comprising a commit unit arranged to identify instructions that have been committed for execution, wherein the working copy of the current window pointer is synchronized with an architectural copy of a current window pointer following a commit of a write privileged register instruction by the commit unit.

12. The apparatus of claim 1, further comprising a commit unit arranged to identify instructions that have been committed for execution, wherein the working copy of the current window pointer is synchronized with an architectural copy of a current window pointer following a clear pipe signal generated by the commit unit.

13. The apparatus of claim 12, wherein the clear pipe signal is dependent on at least one selected from whether a branch is mispredicted, whether an instruction execution results in an exception, whether an external interrupt occurs, and whether a strand is parked.

14. A method for handling a window management instruction, comprising:

decoding the window management instruction;

storing information in at least one of a plurality of register windows dependent on the decoding;

updating a working copy of a current window pointer that indexes the at least one of the plurality of register windows;

breaking a bundle of instructions dependent on a position of the window management instruction within the bundle such that a last instruction forwarded is a window management instruction, and updating the working copy of the current window pointer in the same cycle the window management instruction is forwarded.

15. The method of claim 14, further comprising flattening a register dependent on the working copy of the current window pointer.

16. The method of claim 14, wherein the updating is dependent on multiple strands.

17. The method of claim 14, further comprising maintaining a working copy of at least one selected from the group consisting of CANSAVE, CANRESTORE, OTHERWIN, and CLEANWIN.

18. The method of claim 14, further comprising synchronizing the working copy of the current window pointer with an architectural copy of a current window pointer.

19. An apparatus, comprising:

means for decoding a window management instruction;

means for storing information dependent on the means for decoding; and means for updating a working copy of a current window pointer; and means for breaking a bundle of instructions dependent on a position of the window management instruction within the bundle such that a last instruction forwarded is a window management instruction, wherein the working copy of the current window pointer is undated in the same cycle the window management instruction is forwarded.

20. The apparatus of claim 19, further comprising:

means for flattening a register dependent on the working copy of the current window pointer.

* * * * *